United States Patent [19]

De Vos et al.

[11] Patent Number: 5,525,697

[45] Date of Patent: Jun. 11, 1996

[54] PROCESS FOR CELLULAR POLYMERIC PRODUCTS

[75] Inventors: Rik De Vos, Rotselaar; David Randall, Everberg, both of Belgium

[73] Assignee: Imperial Chemical Industries PLC, London, England

[21] Appl. No.: 479,740

[22] Filed: Jun. 7, 1995

Related U.S. Application Data

[60] Division of Ser. No. 156,194, Nov. 22, 1993, Pat. No. 5,439,948, which is a continuation-in-part of Ser. No. 977,988, Nov. 18, 1992, abandoned.

[30] Foreign Application Priority Data

Oct. 14, 1992 [GB] United Kingdom ............... 9221592
Nov. 20, 1992 [GB] United Kingdom ............... 9124635

[51] Int. Cl.$^6$ .................................................. C08G 18/10
[52] U.S. Cl. .................... 528/59; 528/61; 528/67; 521/159; 521/160; 524/795; 524/839
[58] Field of Search ........................... 528/61, 67, 59; 521/159, 160; 524/795, 839

[56] References Cited

U.S. PATENT DOCUMENTS

| | | | |
|---|---|---|---|
| 4,972,002 | 11/1990 | Volkert | 521/120 |
| 4,972,004 | 11/1990 | Randall et al. | 521/159 |
| 4,981,879 | 1/1991 | Snider | 521/131 |
| 5,034,424 | 7/1991 | Wenning et al. | 521/109.1 |

FOREIGN PATENT DOCUMENTS

| | | |
|---|---|---|
| 0450308 | 10/1981 | European Pat. Off. . |
| 0310345 | 4/1989 | European Pat. Off. . |
| 0508648 | 10/1992 | European Pat. Off. . |
| 0508649 | 10/1992 | European Pat. Off. . |
| 3829104 | 3/1990 | Germany . |

*Primary Examiner*—Samuel A. Acquah

[57] ABSTRACT

The invention provides a process for the preparation of a cellular polymeric product which comprises reaction of a polyisocyanate composition with an isocyanate-reactive composition having a functionality of at least 2, in the presence of a blowing agent and in the presence of an inert, organic liquid which is substantially insoluble in the reaction mixture and which is present as the disperse phase of an emulsion or a microemulsion, characterized in that the polyisocyanate composition comprises polymethylene polyphenylene polyisocyanate having a functionality of at least 2.5 and a urethane-modified, isocyanate-ended prepolymer, wherein the isocyanate functionality of the polyisocyanate composition is at least 2.3 and wherein the concentration of urethane linkages in the polyisocyanate composition is in the range from 1 millimole to 150 millimoles per 100 grams thereof. The invention also provides a novel polyisocyanate composition for use in the process and cellular polymeric products prepared according to the process.

2 Claims, No Drawings

PROCESS FOR CELLULAR POLYMERIC PRODUCTS

CROSS REFERENCE TO RELATED APPLICATIONS

The present application is a divisional of U.S. patent application Ser. No. 08/156,194, filed Nov. 22, 1993 now U.S. Pat. No. 5,439,948, which is a continuation-in-part of abandoned U.S. patent application Ser. No. 07/977,988, filed Nov. 18, 1992.

This invention relates to a method for the preparation of cellular polymeric products to cellular polymeric products prepared thereby, and to polyisocyanate compositions for use therein.

The preparation of cellular polyurethane and polyurethane-modified polyisocyanurate materials by reaction of organic polyisocyanates with polyols and other isocyanate reactive materials in the presence of a blowing agent is well established. Depending upon the formulations used in their manufacture, the products vary in their texture from soft flexible foams used as cushioning materials to rigid foams used as insulating or constructional materials with densities varying from below 10 to above 1100 kg/m3.

The physical properties of the chlorofluorocarbons, and in particular trichlorofluoromethane (CFC-11), have for many years led to their selection as the blowing agents of choice for many applications, and in particular where the thermal insulation properties of the foamed product are of significance. Recent concern over the environmental impact of fully halogenated chlorofluorocarbons on the levels of ozone in the atmosphere has led to the need to develop alternative processes and materials for the preparation of foamed products with suitable properties for their many applications. In particular there is a continuing need to produce foamed products exhibiting acceptable thermal insulation properties using alternative blowing agents.

The use of inert compounds which are insoluble or poorly soluble in the polyol or polyisocyanate components of certain foam compositions and which lead to foams having reduced cell size and improved thermal insulation properties is disclosed in U.S. Pat. No. 4,981,879, U.S. Pat. No. 5,034,424, U.S. Pat. No. 4,972,002 and European Patent Application Nos 0508648 and 0508649. The insoluble, inert compounds disclosed in these references may be either blowing or non-blowing depending upon the usual factors such as the boiling point of the compound and the conditions employed for the preparation of the foam material. In some cases it is believed that the inert, insoluble, non-blowing compound acts as a nucleating agent for the volatilisation of the blowing agent or agents (which may include the insoluble fluorinated compound itself). The compounds described in the references mentioned above are most suitably highly fluorinated or perfluorinated and are expensive to manufacture in view of their high fluorination level. The quantities required to achieve the necessary level of improvements in thermal insulation properties and reduced cell size, particularly when used in combination with blowing agents other than the fully halogenated chlorofluorocarbons, represent a substantial increase in the overall cost of foam manufacture. A further problem associated with many of the additives described in the references mentioned above, and especially with those exhibiting a high level of fluorination, is their persistence in the environment and, in common with many halocarbon compounds, their potential for causing an increase in global warming. It is therefore desirable that the quantities of such compounds in the environment should be reduced to the lowest practicable levels. It has now been found that the beneficial effect of including inert, insoluble compounds in compositions for the preparation of foamed polyurethane or polyurethane-modified polyisocyanurate can be maintained using significantly reduced quantities of such compounds if they are used in conjunction with certain polyisocyanate prepolymer compositions. Suitable prepolymer compositions have been described in European Patent Application No 0310345. However, neither their use in combination with inert, insoluble compounds, nor the synergistic effect of such a combination has been reported.

Accordingly the invention provides a process for the preparation of a cellular polymeric product which comprises reaction of a polyisocyanate composition with an isocyanate-reactive composition having a functionality of at least 2, in the presence of a blowing agent and in the presence of an inert, organic liquid which is substantially insoluble in the reaction mixture and which is present as the disperse phase of an emulsion or a microemulsion, characterised in that the polyisocyanate composition comprises polymethylene polyphenylene polyisocyanate having a functionality of at least 2.5 and a urethane-modified, isocyanate-ended prepolymer, wherein the isocyanate functionality of the polyisocyanate composition is at least 2.3 and wherein the concentration of urethane linkages in the polyisocyanate composition is in the range from 1 millimole to 150 millimoles per 100 g thereof.

Cellular polymeric products, and in particular rigid polyurethane and/or urethane-modified polyisocyanurate foams, produced according to the process of the invention are characterised by finer cell structure and improved thermal insulation properties in comparison with those observed for the corresponding foams produced using standard compositions or the compositions disclosed in U.S. Pat. Nos. 4,981,879, 5,034,424 and 4,972,002 or in European Patent Application Nos 0508648 and 0508649. Furthermore, it has been found that the quantity of inert, organic liquid required to produce the previously reported levels of fine cell structure and thermal insulation properties may be reduced significantly, in comparison with previously reported quantities, when such inert, organic liquids are used in combination with the polyisocyanate compositions as specified herein and in accordance with the process of the invention.

The process of the invention is suitable for the preparation of all types of polyurethane and polyurethane-modified polyisocyanurate foams, for example flexible foams, integral skin foams, microcellular elastomers and especially rigid foams. The functionality of the polyisocyanate compositions used in the process of the invention may be selected according to the application, but will suitably be within the range from 2.3 to 3.5, and preferably in the range from 2.3 to 3.1.

The polymethylene polyphenylene polyisocyanates which are comprised in the polyisocyanate compositions and which have a functionality of at least 2.5 are commercially available materials known by the general name of 'polymeric MDI' and manufactured by the phosgenation of polyamine mixtures obtained from the condensation of aniline and formaldehyde in appropriate proportions. For the purposes of the invention, polymeric MDIs having functionality in the range 2.5–3.5, and preferably 2.5–3.1, are particularly suitable.

The urethane-modified, isocyanate-ended prepolymer which is comprised in the polyisocyanate compositions for use in the process of the invention is preferably prepared by the reaction of a stoichiometric excess of a diisocyanate and a difunctional isocyanate-reactive component, using conventional techniques, for example by reacting the diisocyanate with the difunctional isocyanate-reactive component at a temperature of from 70° C. to 90° C. The preferred diisocyanate is diphenylmethane diisocyanate (MDI) which may be used in the form of any of its individual 4,4'-, 2,4'- or 2,2'-isomers, or any mixture thereof. Preferably, MIDI comprising from 0% to 30% of the 2,4'-isomer and from 70 to 100% of the 4,4'-isomer is used. Alternatively, the diisocyanate used for the preparation of the urethane-modified, isocyanate-ended prepolymer may be toluene diisocyanate (TDI) in the form of its 2,4 or 2,6-isomer or as a mixture of these isomers. The difunctional isocyanate-reactive component from which the urethane-modified, isocyanate-ended prepolymer is derived preferably comprises a diol or a mixture of diols but may, if desired, comprise any other compound having two isocyanate-reactive groups of which one is a hydroxy group, such as an aminoalcohol. Other compounds having two isocyanate-reactive groups other than hydroxy, such as diamines, may be present in addition. The molecular weight of the difunctional isocyanate-reactive component is suitably below 2000, and preferably below 1000. Particularly suitable compounds include alkylene or oxyalkylene diols having molecular weights up to 200, for example ethylene glycol, propane-1,2-diol, propane-1,3-diol, butane-1,3-diol, butane- 1,4-diol, hexane-1, 6-diol and mixtures thereof. Also suitable are diethylene glycol, dipropylene glycol, tripropylene glycol and other polyethylene and polypropylene glycols having molecular weights of below 1000 and mixtures thereof.

The urethane-modified, isocyanate-ended prepolymer may be prepared using conventional techniques, for example by reacting the diisocyanate with the isocyanate-reactive component at temperatures of from 70° to 90° C. The relative amounts of the diisocyanate and the isocyanate-reactive compound are such that no unreacted isocyanate-reactive groups remain after the formation of the prepolymer.

In most cases an amount of unreacted diisocyanate will remain once the prepolymer has been formed. The urethane-modified prepolymer is then combined with a polymethylene polyphenylene polyisocyanate having a functionality of at least 2.5 to form the polyisocyanate compositions for use in the process of the invention. The final functionality of the compositions will depend on the relative quantities, molecular weights and functionalities of the components, but must be at least 2.3.

The concentration of urethane linkages in the polyisocyanate composition is dependent upon the quantity, molecular weight and hydroxyl functionality of the isocyanate-reactive component used in the preparation of the urethane-modified prepolymer, and is in the range 1–150 millimoles per 100 g polyisocyanate composition, preferably 10–120 millimoles per 100 g polyisocyanate composition. Particularly suitable compositions for use in the process of the invention are those having a concentration of urethane linkages in the range 20–100 millimoles per 100 g polyisocyanate composition, and most suitably in the range 30–80 millimoles per 100 g polyisocyanate composition.

The concentration of urethane linkages can be readily determined for any polyisocyanate composition used in the process of the invention and is equal to the concentration of hydroxyl groups contributed by the isocyanate-reactive component prior to the prepolymerisation reaction, expressed as millimoles per 100 g of the total polyisocyanate composition.

The polyisocyanate compositions for use in the process of the invention may contain other polyisocyanates in addition to the polymethylene polyphenylene polyisocyanate having a functionality of at least 2.5 and the urethane-modified, isocyanate-ended prepolymer. In particular additional components such as toluene diisocyanate, in the form of its 2,4- or 2,6-isomers or a mixture thereof, or uretonimine- and allophanate-modified polyisocyanates may be present provided the functionality of the polyisocyanate composition as a whole is at least 2.3.

With reference to the inert, organic liquid used in the process of the invention, the expression "inert" is to be understood as meaning that the liquid is chemically inert with respect to the other ingredients of the cellular polymeric product-forming reaction system. The term "substantially insoluble" is to be understood as meaning that the liquid has a solubility in both the polyisocyanate composition and the difunctional isocyanate-reactive composition of less than 500 parts per million at 25° C. and atmospheric pressure.

Inert, organic liquids which are for use in the process according to the invention include any of those disclosed in U.S. Pat. No. 4981879, U.S. Pat. No. 5,034,424, U.S. Pat. No. 4,972,002 and European Patent Application Nos 0508648 and 0508649. It is preferred, however, to use a substantially fluorinated or perfluorinated compound having a boiling point of at least 40° C. at atmospheric pressure, and preferably at least 60° C., and more preferably at least 80° C. or 100° C. Suitable compounds include substantially fluorinated or perfluorinated hydrocarbons, substantially fluorinated or perfluorinated ethers, substantially fluorinated or perfluorinated tertiary amines, substantially fluorinated or perfluorinated amino-ethers and substantially fluorinated or perfluorinated sulphones.

Suitable examples of substantially fluorinated and perfluorinated hydrocarbons are those containing from 1 to 15 carbon atoms, which may be either cyclic or acyclic, either aromatic or aliphatic and either saturated or unsaturated, such as substantially fluorinated and perfluorinated methane, ethane, propane, butane, pentane, hexane, heptane, octane, nonane, decane, cyclobutane, cyclooctane, cyclohexane, cyclopentane, norbornadiene, decaline, dimethylcyclohexane, methylcyclohexane, 1-methyldecaline, phenanthrene, dimethylcyclobutane, and isomers thereof. Particular mention may be made of perfluoro-n-pentane and perfluoro-n-hexane.

Suitable examples of substantially fluorinated or perfluorinated ethers are those containing from 3 to 15 carbon atoms, which may be cyclic or acyclic, such as substantially fluorinated or perfluorinated dialkyl ethers and alkyl substituted cyclic ethers. Particular mention may be made of perfluorinated methyl ethyl ether, perfluorinated methyl propyl ether, the perfluorinated alkyltetrahydropyrans such as perfluorinated propyltetrahydropyran, and the perfluorinated alkyltetrahydrofurans such as perfluorinated propyltetrahydrofuran and perfluorinated butyltetrahydrofuran. Additional examples of substantially fluorinated or perfluorinated ethers which are suitable for use in the process of the invention are the commercially available fluorinated polyethers such as Galden HT 100, HT 200, HT 230, HT 250 and HT 270 from Montefluos SpA (Galden is a Trade Mark).

Suitable examples of substantially fluorinated or perfluorinated amines are tertiary amines containing from 3 to 15 carbon atoms, which may be cyclic or acyclic, such as substantially fluorinated or perfluorinated trialkylamines, N-alkylated cyclic amines, tetraalkylhydrazines and trialkylhydroxylamines. Particular mention may be made of substantially fluorinated or perfluorinated trimethylamine, triethylamine, ethyldimethylamine, methyldiethylamine, tripropylamine, tributylamine, tripentylamine, tetramethylhydrazine, trimethylhydroxylamine, O-ethyl dimethylhydroxylamine, O,O'-bis-(dialkylamino)propyleneglycol, O,O'-bis-(dialkylamino)ethyleneglycol, N-methyl-pyrrolidine and the N-alkylpiperidines such as N-methylpiperidine.

Suitable examples of substantially fluorinated or perfluorinated aminoethers include those having from 3 to 15 carbon atoms, which may be cyclic or acyclic, such as substantially fluorinated or perfluorinated trialkylethanolamines and N-alkylmorpholines. Particular mention may be made of substantially fluorinated or perfluorinated trimethylethanolamines and N-($C_{1-6}$ alkyl)morpholines such as N-methyl, N-ethyl and N-isopropylmorpholine.

Suitable examples of substantially fluorinated or perfluorinated sulphones include perfluorinated dialkylsulphones having from 2 to 8 carbon atoms such as perfluoro-(dimethylsulphone and perfluoro-(methyldiethylsulphone).

The terms substantially fluorinated or perfluorinated as used herein with reference to the insoluble fluorinated compound for use in the process according to the invention are to be understood to embrace compounds in which from 75% to 100% of the hydrogen atoms of the unfluorinated compounds are replaced by fluorine.

To ensure that the inert, organic liquids do not contribute to ozone depletion, it is preferred to use fluorinated compounds containing no chlorine or bromine atoms.

The amount of inert, organic liquid used in the process of the invention is typically from 0.01 to 5 parts by weight based on the total weight of the reaction system, preferably from 0.05–4 parts by weight, and most suitably from 0.1 to 2 part by weight.

The isocyanate-reactive composition to be used in the process of the present invention is dependent upon the type of polymeric product to be prepared.

Suitable isocyanate-reactive compositions include polyols, polyamines, imines and enamines and mixtures thereof, as well as compounds of mixed isocyanate-reactive functionality.

For the preparation of rigid polyurethane or urethane-modified polyisocyanurate foams, suitable isocyanate-reactive compositions include polyols having a molecular weight of 62 to 1500 and a functionality of 2–8, more especially 3–8. For the preparation of flexible polyurethane foams, suitable isocyanate-reactive compositions include polyols having a molecular weight of 1000 to 10000 and a functionality of 2–4, more especially 2–3. For the preparation of elastomers, mixtures of high and low molecular weight isocyanate-reactive compounds are generally used.

Polymeric polyols have been fully described in the prior art and include reaction products of alkylene oxides, for example, ethylene oxide and/or propylene oxide, with initiators containing from 2 to 8 active hydrogen atoms per molecule. Suitable initiators include diols and polyols, for example glycols, glycerol, trimethylolpropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyamides, polyesteramides, polycarbonates, polyacetals, polyolefins and polysiloxanes.

Polyamines having a molecular weight of at least 1000 include amino-ended polyethers, polyesters, polyesteramides, polycarbonates, polyacetols, polyolefins and polysiloxanes.

Polyamines having a molecular weight below 1000 include aliphatic, cycloaliphatic or aralphatic polyamines containing two or more primary and/or secondary amino groups,—such as the low molecular weight amino-ended polyethers, and aromatic polyamines such as DETDA. Suitable imino- or enamino functional reactants include those compounds which are derived from the modification of the above described amino-functional compounds, e.g. upon their reaction with an aldehyde or a ketone.

Mixtures of isocyanate-reactive components varying in chemical structure and/or molecular weight and/or functionality may be used in the process of the invention where appropriate for the required polymeric product.

The inert organic liquid will usually be incorporated in the foam-forming reaction mixture as an emulsion or preferably a microemulsion in one of the major components, that is to say in the isocyanate-reactive composition or the polyisocyanate composition or in a third stream. Such emulsions or microemulsions may be prepared using the conventional techniques known in the art and suitable emulsifying agents.

Emulsifying agents suitable for preparing stable emulsions or microemulsions of inert, organic liquids in organic polyisocyanate compositions and/or isocyanate-reactive compositions include surfactants chosen from the group of nonionic, ionic i.e. anionic or cationic, and amphoteric surfactants. Preferred surfactants are fluoro surfactants and/or alkoxylated alkanes. Particular examples of fluoro surfactants include: fluorinated alkyl polyoxyethylene ethanols, fluorinated alkyl alkoxylates and fluorinated alkyl esters.

Polyisocyanate compositions for use in the process of the invention comprising the inert, organic liquid have not been previously described. In a further aspect, therefore, the invention provides a polyisocyanate composition comprising polymethylene polyphenylene polyisocyanate having a functionality of at least 2.5 and a urethane-modified, isocyanate-ended prepolymer, wherein the isocyanate functionality of the polyisocyanate composition is at least 2.3 and wherein the concentration of urethane linkages in the polyisocyanate composition is in the range from 1 to 150 millimoles per 100 grams thereof, and further comprising an inert organic liquid which is substantially insoluble in the polyisocyanate composition and is present therein as the disperse phase of an emulsion or a microemulsion.

Suitable blowing agents for use in the process of the present invention include water or other carbon dioxide—evolving compounds, or inert low boiling compounds having a boiling point of above −50° C. at atmospheric pressure.

Where water is used as blowing agent, the amount may be selected in known manner to provide foams of the desired density, typical amounts being in the range from 0.05 to 5 parts by weight per 100 parts by weight of reactive ingredients, although it may be a particular embodiment of the present invention to incorporate up to 10 % by wt or even up to 20 % by wt of water for the preparation of flexible foams.

Suitable inert blowing agents include those well known and described in the art, for example hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

Suitable hydrocarbon blowing agents include lower aliphatic or cyclic hydrocarbons such as pentane, iso-pentane, cyclopentane or neopentane, hexane, cyclohexane.

Suitable dialkyl ethers to be used as blowing agents include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether, and ethyl t-butyl ether.

Suitable alkyl alkanoates which may be used as blowing agents include methyl formate, methyl acetate, ethyl formate and ethyl acetate.

Suitable hydrofluorocarbons which may be used as blowing agents include lower hydrofluoroalkanes, for example 1,2-difluoroethane, 1,1,1,4,4,4-hexafluorobutane, pentafluoroethane, 1,1,1,2-tetrafluoroethane and 1,1,2,2-tetrafluoroethane.

Suitable hydrochlorofluorocarbons which may be used as blowing agents include chlorodifluoromethane, 1,1-dichloro-2,2,2-trifluoromethane, 1,1-dichloro-1-fluoroethane, 1-chloro-1,1-difluoroethane, 1-chloro-1-fluoroethane, 1-chloro-2-fluoroethane, and 1,1,1,2-tetrafluoro-2-chloroethane.

Suitable chlorofluorocarbons which may be used as blowing agents include trichlorofluoromethane, dichlorodifluoromethane, trichlorotrifluoroethane and tetrafluorodichloroethane.

Suitable hydrochlorocarbons which may be used as blowing agents include 1- and 2-chloropropane.

Suitable fluorine-containing ethers which may be used as blowing agents include:

$CF_3OCF_3$, $CF_3OCF_2H$, $CH_3OCH_2F$, $CF_3OCH_3$, $CF_2HOCF_2H$, $CF_2HOCH_2F$, $CF_2HOCH_3$, $CH_2FOCH_2F$, $CH_2FOCH_3$, $CF_3CH_2OCF_2H$, $CF_3CF_2OCF_3$, $CHF_2CF_2OCF_2H$, $CF_3CHFOFC_2H$, $CF_2HCHFOCF_2H$, $CHF_2CF_2OCH_3$, $(CF_3)_2CHOCH_2F$.

Preferred blowing agents for use in a particular embodiment of the process of the present invention are those having boiling points between −70° C. and +15° C. at atmospheric pressure, and more preferably between −70° C. and +5° C. at atmospheric pressure.

Examples of preferred gaseous blowing agents for use in the process of the present invention include $CHClF_2$, $CH_2F_2$, $CF_3CH_2F$, $CF_2HCF_2H$, $CH_3CClF_2$, $C_2H_4F_2$, $C_2HF_5$, $C_2HClF_4$ and mixtures thereof.

Certain inert, organic liquids suitable for use in the process of the invention may themselves act as blowing agents under the conditions pertaining to the reaction of the polyisocyanate and isocyanate-reactive compositions, particularly where their boiling point is lower than the exotherm temperature achieved by the reaction mixture. For the avoidance of doubt, such materials may, partly or completely, fulfil the function of blowing agent in addition to that of inert, organic liquid according to the process of the invention.

The total quantity of blowing agent to be used in a reaction system for producing cellular polymeric materials will be readily determined by those skilled in the art, but will typically be from 2 to 25 % by weight based on the total reaction system.

In addition to the polyisocyanate composition of the present invention, the isocyanate-reactive composition, the volatile blowing agent and the inert, organic liquid, the foam-forming reaction mixture will commonly contain one or more other auxiliaries or additives conventional to formulations for the production of cellular polymeric products.

In the case of rigid foams, such optional additives include crosslinking agents, for example low molecular weight polyols such as triethanolamine, foam-stabilising agents or surfactants, for example siloxane-oxyalkylene copolymers, urethane catalysts, for example tin compounds such as stannous octoate or dibutylin dilaurate or tertiary amines such as dimethylcyclohexylamine or triethylene diamine, and fire retardants, for example halogenated alkyl phosphates such as tris chloropropyl phosphate.

In operating the process of the invention, the known one-shot, prepolymer or semi-prepolymer techniques may be used together with conventional mixing methods and the cellular polymeric products may be produced in the form of slabstock, mouldings, cavity fillings, sprayed foam, frothed foam or laminates with other materials such as hardboard, plasterboard, plastics, paper or metals. By the use of appropriate starting materials and suitable amounts of blowing agents, the cellular polymeric products obtained by the process of the invention may take the form of rigid foams, flexible foams, microcellular elastomers or integral skin foams.

The process of the present invention is also suitable for preparing open celled rigid polyurethane foam.

A particular suitable process for preparing an open celled rigid polyurethane foam is described in European patent application no. 0 498 628. This process involves reacting a polyisocyanate composition, for example a polyisocyanate composition according to the present invention, with a polyol composition in the presence of an isocyanate-reactive cyclic carbonate (such as glycerol carbonate) or cyclic urea (such as Fixapret NF available from BASF) as blowing promotor and in the presence of an inert insoluble fluorinated compound and a metal salt catalyst (such as Catalyst LB available from Imperial Chemical Industries PLC).

The present invention is illustrated but not limited by the following examples.

To demonstrate the advantages of the cellular polymeric products produced by the process of the invention, rigid foams were prepared according to usual procedures by reaction of a polyisocyanate composition according to the invention with a number of polyol compositions incorporating different amounts of an inert, organic liquid. Example 1 illustrates the polyol compositions 1a to 1f which contain a proportion of inert, organic liquid varying from 0 to 3.0 parts by weight. Example 2 illustrates the standard polyisocyanate composition and a prepolymer polyisocyanate composition according to the process of the present invention. Example 3 shows the properties of foams prepared from the compositions for comparison purposes. Example 4 shows the properties of open celled rigid foams prepared according to the process of the present invention.

EXAMPLE 1

The following polyol emulsions were prepared by mixing under high shear the following components: (parts are by weight)

TABLE 1

| | Polyol Compositions | | | | | |
|---|---|---|---|---|---|---|
| | 1a | 1b | 1c | 1d | 1e | 1f |
| A polyether polyol blend of OH value = 400 | 100 | 100 | 100 | 100 | 100 | 100 |
| Dimethyl cyclohexyl amine (catalyst) | 1.5 | 1.5 | 1.5 | 1.5 | 1.5 | 1.5 |

TABLE 1-continued

|  | Polyol Compositions | | | | | |
|---|---|---|---|---|---|---|
|  | 1a | 1b | 1c | 1d | 1e | 1f |
| Niax A1 (an amine catalyst from Union Carbide) | 0.3 | 0.3 | 0.3 | 0.3 | 0.3 | 0.3 |
| Tegostab B8404 (a silicone surfactant from Goldschmidt) | 3.0 | 3.0 | 3.0 | 3.0 | 3.0 | 3.0 |
| $H_2O$ | 0.5 | 0.5 | 0.5 | 0.5 | 0.5 | 0.5 |
| A22 | 22 | 22 | 22 | 22 | 22 | 22 |
| Inert, organic liquid (Perfluorobutyl-tetrahydrofuran) | 3.0 | 2.0 | 1.0 | 0.5 | 0.3 | 0 |
| Fluorosurfactant FC430 (from 3M) | 2.0 | 1.0 | 1.0 | 0.5 | 0.5 | 0 |
| Total Composition (pbw) used in Example 3 | 132.3 | 130.3 | 129.3 | 128.3 | 128.1 | 127.3 |

EXAMPLE 2

The following isocyanate compositions were used:

2a  polymeric MDI - commercialised by ICI PLC as Suprasec DNR (for comparative example)
2b  polyisocyanate composition of average functionality 2.6 used according to the present invention
    80% weight of polymeric MDI
    20% weight of a prepolymer obtained by reacting
    90 parts of a minimum of 4,4'/2,4' MDI
    (7.4%–2.6%) and
    10 parts of a mixture of propylene glycol, 1-3 butane diol, tripropylene glycol (0.8:0.8:1.0 molar ratio).
    Calculation of concentration of urethane linkages in polyisocyanate composition 2b:
    Proportion of diol mixture in prepolymer = 10%
    Proportion of diol mixture in total composition = 2%
    i.e. 2 g per 100 g of total composition
    number of millimoles of hydroxyl groups in 2 g diol mixture:
        from propylene glycol    = 10 mmols
        from 1,3-butanediol      = 10 mmols
        from tripropylene glycol = 12 mmols TOTAL = 32 mmols
    Concentration of urethane linkages on full conversion is therefore 32 millimoles per 100 g total polyisocyanate composition.

EXAMPLE 3

Rigid polyurethane foams A to L were prepared by standard techniques by reaction of the polyol compositions 1a to 1f (in an amount equal to the total composition in parts by weight as recorded in Table 1) with 165 parts by weight of the polyisocyanate compositions 2a or 2b as described in Example 2.

The thermal insulation properties of the foams were determined by measurement of the lambda (initial) and lambda (aged –5 weeks at 70° C.) values. The lambda values are recorded in Table 2.

Comparison of each pair of lambda values in Table 2 illustrates the improvement (reduction) in lambda values provided by use of the prepolymer polyisocyanate compositions (2b) in place of the standard polyisocyanate composition (2a).

Comparison of the lambda values for foams A to J with those of foams K and L shows the improvement in lambda value provided by the incorporation of an inert, organic liquid.

However, comparison of the lambda values of foams B, D, F, H and J prepared from prepolymer polyisocyanate composition 2b with those of foams A, C, E, G and I prepared from the standard isocyanate composition illustrates that the amount of inert, organic liquid required in the polyol composition to produce a given improvement in lambda value is considerably reduced in reaction systems based on prepolymer polyisocyanate compositions according to the process of the invention when compared to those based on standard polyisocyanate. Thus foam J, (derived from the prepolymer polyisocyanate composition 2b) exhibits substantially similar thermal insulation properties to foam C (derived from standard polyisocyanate composition 2a) at a level of inert, organic liquid additive which is reduced by a factor of 6.7 (0.3 pbw compared with 2.0 pbw).

TABLE 2

|  | Rigid foams. | | | | | | | | | | | |
|---|---|---|---|---|---|---|---|---|---|---|---|---|
|  | A | B | C | D | E | F | G | H | I | J | K | L |
| Polyol Composition | 1a | 1a | 1b | 1b | 1c | 1c | 1d | 1d | 1e | 1e | 1f | 1f |
| Polyisocyanate Composition | 2a | 2b | 2a | 2b | 2a | 2b | 2a | 2b | 2a | 2b | 2a | 2b |
| Amount of inert organic liquid pbw (from Table 1) | 3.0 | 3.0 | 2.0 | 2.0 | 1.0 | 1.0 | 0.5 | 0.5 | 0.3 | 0.3 | 0.0 | 0.0 |
| Lambda (initial)* | 18.6 | 17.8 | 18.7 | 18.0 | 19.2 | 18.0 | 19.5 | 18.1 | 19.7 | 18.6 | 19.8 | 19.4 |
| Lambda (aged)* | 26.4 | 25.2 | 26.5 | 25.0 | 28.0 | 25.0 | 28.2 | 25.5 | 27.6 | 26.3 | 28.5 | 28.5 |

*mW/m°K. at 10° C.
All foams exhibited a density of ca 30 kg/m³

EXAMPLE 4

Open celled rigid polyurethane foams M and N were prepared by reaction of the ingredients indicated in Table 3 (amounts in pbw). Cell size of the obtained foams are also recorded in Table 3.

TABLE 3

| Open celled rigid foams. | | |
| --- | --- | --- |
|  | M | N |
| Polyol 1 | 70 | 70 |
| Polyol 2 | 30 | 30 |
| DC 193 | 4 | 4 |
| Fixapret NF | 1.8 | 1.8 |
| Catalyst LB | 1.85 | 1.85 |
| Perfluoropentane | 10.1 | 10.1 |
| Polyisocyanate 2a | 152 | — |
| Polyisocyanate 2b | — | 158 |
| Cell size (micron) | 125 | 80 |

Polyol 1 is a polyether polyol of OH value 500.
Polyol 2 is a polyether polyol of OH value 54.
DC193 is a silicone surfactant available from DOW Corning.
Fixapret NF is a cyclic urea available from BASF.
Catalyst LB is a metal salt catalyst available from Imperial Chemical Industries PLC.

These results show that a reduction in cell size is obtained by using the prepolymer polyisocyanate composition according to the present invention (2b) in place of the standard polyisocyanate composition (2a) for the same amount of inert, organic liquid.

Alternatively, the same cell size can be obtained by using the prepolymer polyisocyanate composition instead of the standard polyisocyanate composition but at reduced levels of inert, organic liquid.

Further the processability is improved by using the present prepolymer polyisocyanate compositions.

We claim:

1. Polyisocyanate composition comprising polymethylene polyphenylene polyisocyanate having a functionality of at least 2.5 and a urethane-modified, isocyanate-ended prepolymer, wherein the isocyanate functionality of the polyisocyanate composition is at least 2.3 and wherein the concentration of urethane linkages in the polyisocyanate composition is in the range from 1 millimole to 150 millimoles per 100 grams thereof, and further comprising an inert, organic liquid which is substantially insoluble in the polyisocyanate composition and is present wherein as disperse phase of an emulsion or a microemulsion.

2. Polyisocyanate composition according to claim 1 wherein the inert, organic liquid comprises a substantially fluorinated or perfluorinated compound having a boiling point of at least 40° C. at atmospheric pressure.

* * * * *

UNITED STATES PATENT AND TRADEMARK OFFICE
CERTIFICATE OF CORRECTION

PATENT NO. : 5,525,697

DATED : June 11, 1996

INVENTOR(S) : Rik De Vos, David Randall

It is certified that error appears in the above-identified patent and that said Letters Patent is hereby corrected as shown below:

In claim 1, column 12, line 21,... "wherein" should read --therein--.

Signed and Sealed this

Twenty-ninth Day of October 1996

*Attest:*

BRUCE LEHMAN

*Attesting Officer*     *Commissioner of Patents and Trademarks*